United States Patent [19]

Moake

[11] Patent Number: 4,814,611

[45] Date of Patent: Mar. 21, 1989

[54] APPARATUS FOR MEASURING BOREHOLE-COMPENSATED DENSITIES AND LITHOLOGY-DEPENDENT FACTORS USING ONE OR MORE DETECTORS

[75] Inventor: Gordon L. Moake, Houston, Tex.

[73] Assignee: Halliburton Company, Duncan, Okla.

[21] Appl. No.: 67,579

[22] Filed: Jun. 29, 1987

[51] Int. Cl.$^4$ .............................................. G01V 5/12
[52] U.S. Cl. ..................................... 250/269; 250/266
[58] Field of Search .............. 250/269, 264, 265, 266, 250/262

[56] References Cited

U.S. PATENT DOCUMENTS 3,864,569 2/1975 Tittman .............................. 250/269
4,628,202 12/1986 Minette ............................... 250/266

Primary Examiner—Carolyn E. Fields
Attorney, Agent, or Firm—William J. Beard

[57] ABSTRACT

A technique for measuring the density and a lithology-dependent factor, compensated for borehole effects, with a gamma ray logging source and one or more gamma ray detectors has been disclosed. Other borehole variables are also measured and used as quality indicators. The technique uses the spectral information from the detected gamma rays to calculate all of the unspecified variables relevant to the measurement. This technique also allows a lithology-dependent parameter based on the short-spaced detector to be compensated for borehole effects without contaminating the measurement with lesser-quality data from a detector spaced further from the source. Furthermore, it allows multiple measurements of a lithology-dependent factor made with multiple detectors to be compensated separately. The multiple compensated measurements can then be combined to form a quantity which indicates the quality of the measurement. This technique also allows the measurement of a compensated density whose vertical resolution is that of the short-spaced detector.

7 Claims, 2 Drawing Sheets

APPARATUS FOR MEASURING BOREHOLE-COMPENSATED DENSITIES AND LITHOLOGY-DEPENDENT FACTORS USING ONE OR MORE DETECTORS

BACKGROUND OF THE INVENTION

This invention deals with the measurement of density and lithology-dependent factors by irradiating an earth formation with gamma rays and detecting the scattered gamma rays. In particular, this invention provides a means of making borehole-compensated measurements of both the density and a lithology-dependent factor with one or more detectors.

DESCRIPTION OF THE PRIOR ART-GENERAL

Density and lithology-dependent measurements are made with a sonde containing a gamma-ray logging source and one or more detectors. Shielding is provided such that when the sonde is flush against the formation wall, the vast majority of gammas that reach the detector must first have passed through the formation.

The gamma rays of interest here interact with matter almost exclusively through interactions with the electrons. The higher-energy gammas interact with the electrons in a manner independent of the type of atom to which they are attached. These interactions (Compton scattering) are therefore only sensitive to the electron density, and hence the bulk density, of the material. The lower-energy gammas, while sensitive to Compton scattering, can also be completely absorbed by the electron (photoelectric absorption). This process is very sensitive to the type of atom to which it is attached. Thus, quantities that are sensitive primarily to photoelectric absorption can be used as indicators of the formation lithology.

DESCRIPTION OF THE PRIOR ART—DENSITY MEASUREMENTS

Originally, density measurements are made from the total count rate of only one detector. However, these measurements are strongly influenced by the presence of mud or mudcake that formed between the sonde and the formation. Mud is the fluid kept in the borehole during and after the drilling process; it comes between the sonde and formation when the borehole becomes irregular. When the formation is porous, the mud can seep into the formation a short distance, forming a mudcake. This can occur even in smooth boreholes. Since the densities of the mud and mudcake are typically very different from the density of the formation, these measurements could be extremely erroneous whenever mudcake is present or the boreholes is irregular.

Density logging was greatly improved by the introduction of a second detector. With this scheme, one detector (long-spaced) is placed as far from the detector as acceptable. (The limitation is the reduced count rate encountered at larger distances). Gamma rays traveling from the source detector must then pass through the mudcake (or mud) as well as the formation, but the large source-to-detector spacing makes the distance traveled in the mudcake a small fraction of the distance travelled in the pure formation. The second detector (short-spaced) is placed closer to the source, so that the distance traveled in the pure formation is a much larger fraction of the distance travelled in the pure formation than for the long-spaced detector. Since the two detectors have different sensitivities to the mud and formation density, their count rates can be combined to produce a quantity (compensated density) which is much less sensitive to the mudcake. Choosing the proper combination is similar to solving two equations with two unknowns for the desired unknown. The proper combination also greatly minimizes the density dependence of the density calculation on the photoelectric properties of the formation.

Further improvement came when scintillators were used as the gamma detectors and the detected gamma rays were sorted into energy bins. One improvement is the use of count rates from two different energy windows from the short-spaced detector, in conjunction with one count rate from the long-spaced detector, to provide a density measurement that is compensated for two different layers of mud or mudcake, as described in U.S. Pat. No. 4,048,495. Another improvement utilizes the count rate from the low-energy window of the long-spaced detector in the density computation, in an effort to compensate for the effects of photoelectric absorption on the count rates used in the density calculation.

One limitation of all of these compensation schemes is that they rely on the use of a long-spaced detector. This has obvious cost and size limitations. Another limitation is the vertical resolution that can be achieved. The vertical resolution is roughly equal to the source to detector spacing. Thus, density logging with the prior art is limited to the inherent resolution of the long-spaced detector. This and other disadvantages of the prior art are overcome by the well logging method and apparatus of the present invention.

DESCRIPTION OF THE PRIOR ART—LITHOLOGY-DEPENDENT FACTORS

In determining the formation porosity, it is important to know the correct matrix density of the formation. Since this changes with the lithology of the formation, a measurement that is sensitive to the matrix lithology is very useful. As previously discussed, low-energy gammas are affected by photoelectric absorption, the strength of which depends on the atomic makeup of the formation. Thus, low-energy gammas can be used to gather information on the lithology of the formation.

There are several ways in which useful lithology-dependent parameters can be defined. One such as the photoelectric factor, Pe. The first measurement of Pe only utilized the long-spaced detector, and was severely influenced by mud, mudcake, and borehole variations. Improvements were made with the introduction of a tool that measure Pe with both the short-spaced and the long-spaced detectors, primarily because the tighter collimation permissible with the short-spaced detector provides a better measurement. Although a qualitative comparison of the Pe's calculated from the two detectors indicate when the measurements are affected by non-ideal borehole conditions, the individual measurements were not improved.

This and other disadvantages of the prior art are overcome by the well logging method and apparatus of the present invention.

SUMMARY OF THE INVENTION

Briefly, this invention provides a means of measuring the density, a lithology-dependent parameter, and other relevant borehole variables (which can be used as quality indicators) of a geological formation, by irradiating the formation with a source of gamma rays and measuring the scattered gamma radiation. This invention can be divided into one-detector and multi-detector categories.

In the one-detector category, the detector type is chosen so that the detected gamma rays can be sorted into energy windows, with count rates from each window being measured and stored. The number and energy range of the windows are determined by the type of gamma source and the actual application. The number and type of variables to be considered must be determined, remembering that comprising the number of variables will limit the application and or accuracy of the measurement. If the number of variables is greater than the number of energy windows, or if some of the variables are such that the windows all have the same sensitivity to them, then external information will have to be supplied in the calculation. Any of the variables not specified by external information can then be expressed in terms of the different count rates and the external information.

A systematic approach to deriving these expressions is to parameterize the count rates of each detector in terms of the various variables being considered. From this, it is possible to see which information, if any, must be supplied externally. The optimum set of variables consistent with any set of count rates can then be determined. If the parameterization is done in terms of the density and a lithology-dependent factor, then these variables would be determined in the procedure. Also, all of the other variables could be determined as well.

As an example, to measure a compensated density when good vertical resolution is required, this invention uses a single detector placed close to the source. The count rates are parameterized in terms of formation density, a lithology-dependent factor, and other mudcake-dependent variables. The density obtained from this measurement has vertical resolution that is comparable to the source-to-detector spacing. This method differs from that described in U.S. Pat. No. 4,048,495 in that the count rate most sensitive to the formation is taken from the same detector as the count rates that are most sensitive to the mudcake, and in the inclusion of the lithology-dependent term in the density calculation.

The multi-detector category is similar to the single detector category, except that information from other detectors is available. The prior art combined similar density measurements from two different detectors to obtain a compensated density measurement. This method is different in that it uses one type of measurement, obtained from one or more detectors, to compensate another type of measurement made with only one detector. One of the detectors must provide count rates for different energy windows, although this may not be necessary for the other detector(s). The procedure is then the same as for the single-detector category, only now the variables are obtained from the count rates of more than one detector. A novel feature of this invention is that only the best energy windows from each detector are used.

As an example, this invention can measure a compensated lithology-dependent factor using two detectors, which provide count rates for various energy windows. The low-energy windows of the short-spaced detector are much less borehole-dependent than the corresponding windows of the long-spaced detector, although the high-energy windows of both detectors have comparable borehole sensitivity. Thus, the lithology-dependent factor, which is based on the low-energy count rates, is determined from the low-energy count rates of the short-spaced detector, but it is borehole compensated with the high-energy count rates from both detectors. Also calculated with this method are other physical quantities, such as the distance between the sonde and the formation, which can be used as quality indicators. Also, once these physical quantities have been obtained, they can be used to calculate a compensated long-spaced lithology-dependent factor. The difference between this and the corresponding short-spaced factor also makes a good quality indicator.

As another example, this invention uses the two-detector tool described above the measure a compensated density that has the resolution of the short-spaced detector. The compensation is accurate whenever the mudcake variations are gradual. This is done by using both detectors to calculate the variables associated with the mudcake, and then using these variables as external information in calculating the density from only the short-spaced count rates.

DESCRIPTION OF THE PREFERRED EMBODIMENT

Figure 1:
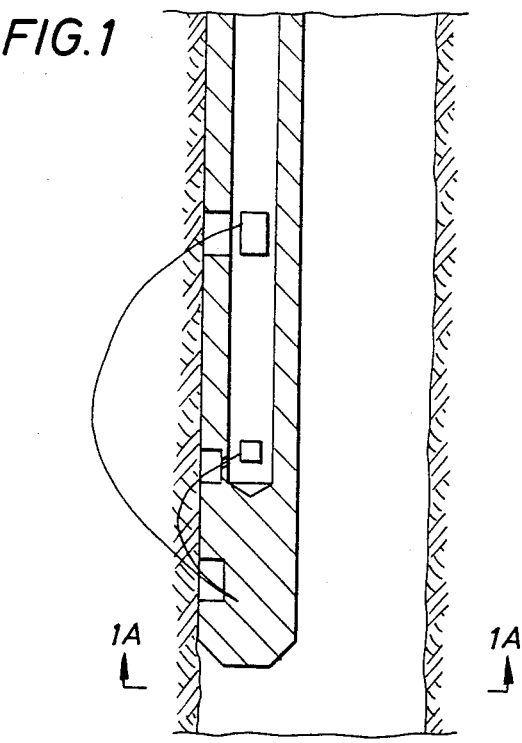
FIG. 1 is an overall scheme of a two-detector version of the preferred apparatus.
Figure 1A:
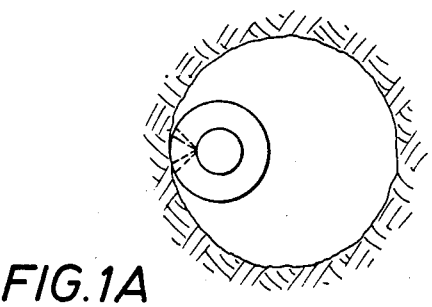
Figure 2:
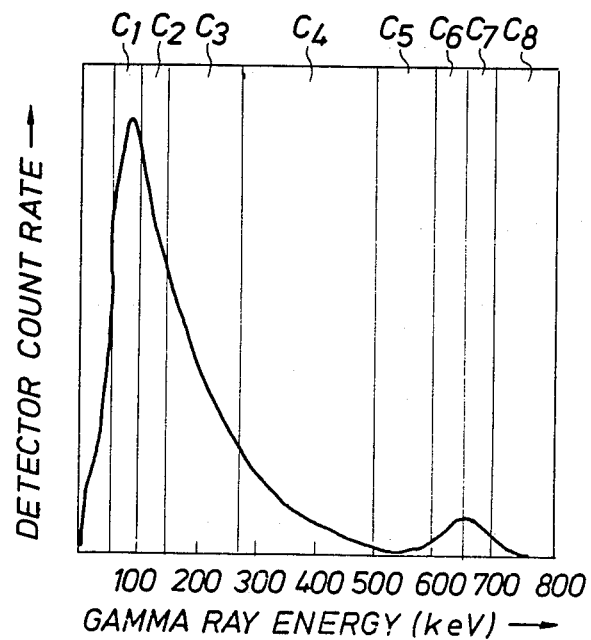
FIG. 2 shows a typical energy spectrum from one of the detectors and the energy windows that can be used.

Referring to FIG. 1, a logging sonde containing a gamma source and one or two detectors is suspended in a borehole. The detector(s) consist of a NaI(T1) scintillation crystal connected to a photomultiplier tube. Tungsten shielding is placed between the detector(s) and source and around the detector(s), thereby insuring that the majority of the detected gammas have traveled in the formation or between the sonde and formation. The radiation source is cesium-137, although other sources could be used, and may be preferable in certain situations. The signals from the detectors are processed in a standard manner to obtain count rates corresponding to different energy ranges of the detected gammas, as shown in FIG. 2. The energy ranges to be used in the calculations are 50–100, 100–35, and 135–260, and 260–506, all in keV. Also, the detectors are stabilized against temperature variations in a manner familiar to those skilled in the art.

Figure 3:
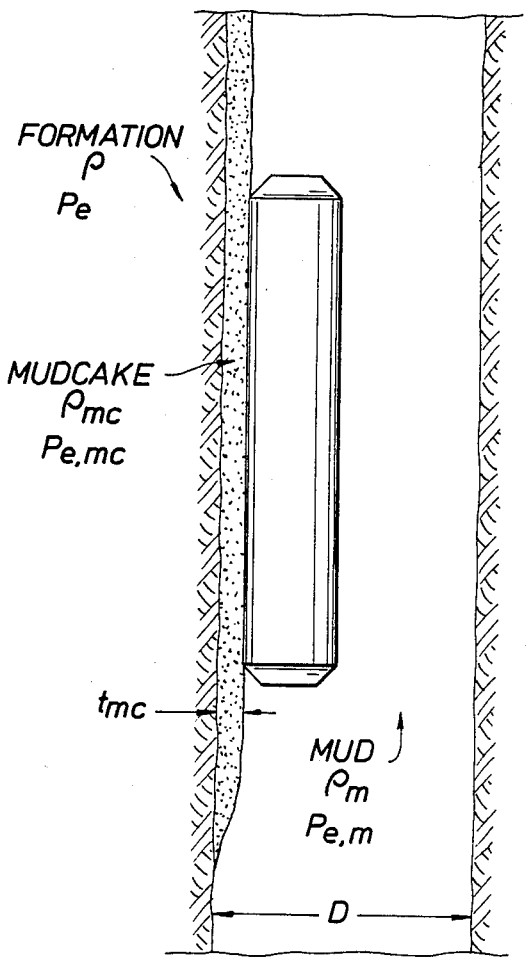
FIG. 3 defines the relevant physical variables.

Referring to FIG. 3, the variables considered to significantly affect the tool response are the density and Pe of the formation; density and Pe of the mudcake; the distance between the sonde and the formation; the density and Pe of the mud; and the borehole diameter. Using experimental data, the response of each count rate has been parameterized in terms of these eight variables. The sum of the two highest-energy windows from each detector has also been parameterized.

TWO-DETECTOR CASE

In the two-detector case, the mud density is obtained from external sources and entered as input by the logging engineer. The Pe of the mud is then approximated from this, assuming that the mud does not contain any high-Pe constituents. When this assumption is true, errors in the approximation are negligible. When there is a high-Pe constituent in the mud, then the distance between the sonde and formation is set equal to zero and no Pe compensation is performed. This is necessary because of the difficulty in quantitatively predicting the effects of these constituents.

Also, the mudcake density is taken to be that of the mud. This is correct when the separation between the sonde and pure formation is primarily due to irregularities in the borehole. When the separation is due to mudcake, this will cause an error in the calculations, but the separations associated with mudcake are generally small, so the error will be small.

The value of the borehole diameter is taken to be the value that is continuously measured by a caliper.

Since only three quantities used in the parameterization of the count rates are unknown, only three of the count rates need to be used to determine them. Good results are obtained by using the sum of the two highest-energy windows of both detectors and the low-energy window of the short-spaced detector. The three equations given by the parameterizations of these three count rates are then solved simultaneously for the three unknown quantities.

The mudcake thickness, when compared to the caliper, is a good indication of the quality of the density and Pe measurements. When the caliper indicates rapid variations in the borehole the sonde will not make good contact with the formation and the measurements will be relying heavily on the compensation technique. If the standoff does not correspond will to the variations in the caliper, then the compensation technique has broken down.

Another quality indicator can be calculated for the Pe measurement. Since all of the variables defined in in problem have been determined, they can all (except Pe) be used in the equation parameterizing the count rate of the long-spaced detector, to provide a compensated long-spaced Pe. Although this value will usually be less reliable than the short-spaced Pe, the difference between the two still provides an indication of the quality of the compensation.

In a similar fashion, all of the variables except the density can be used in the equation parameterizing the high-energy count rate of the short-spaced detector, to calculate a compensated short-spaced density. When the mudcake undergoes gradual variations, the resulting density will have the inherent resolution of the short-spaced detector and not the long-spaced detector.

Of course, it should be understood that more variables could be introduced, as long as more external information is introduced or if more energy windows are used in the calculations.

ONE-DETECTOR CASE

The one-detector case is similar to the two-detector case, except that the long-spaced detector is either not present or not used. This situation is useful when high vertical resolution is required and the mudcake or borehole diameter is changing rapidly. The measurement procedure is identical to the two-detector case, except that the two highest-energy windows are the lowest-energy window are used to solve for the optimum values of the unknown quantities.

Figure 4:
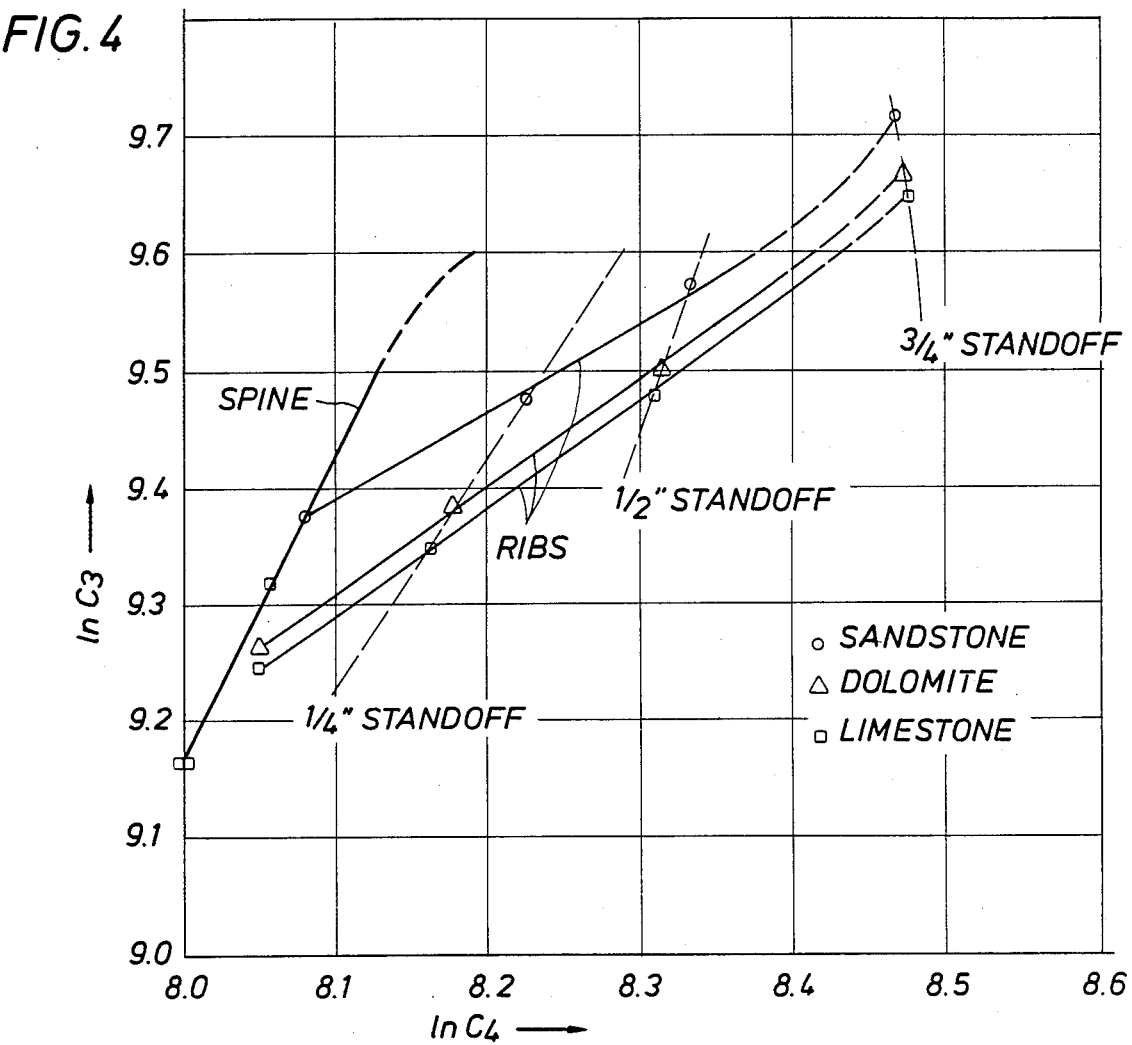
FIG. 4 shows a spine-and-ribs plot for the count rates of two energy windows of the short-spaced detector.

FIG. 4 provides visual proof that compensated density can be obtained with only one detector. This is a plot of the logarithm of the count rates from the second-highest energy window verses the logarithm of the count rates from the highest-energy window, for various distances between the sonde and formation. These count rates are primarily sensitive to the formation density. When the sonde is flush against the formation, the data falls on or near the "spine". A the distance increases, the data plots further and further from the spine, indicating larger and larger errors. However, by following a line passing through the data point back to the spine, in a path parallel to the "ribs", a count rate compensated for the separation of the sonde from the formation can be found. This compensated count rate can then be used to calculate a compensated density. If compensation were not possible, the ribs could be parallel to the spine, and not projection back to the spine would be possible.

Figure 5:
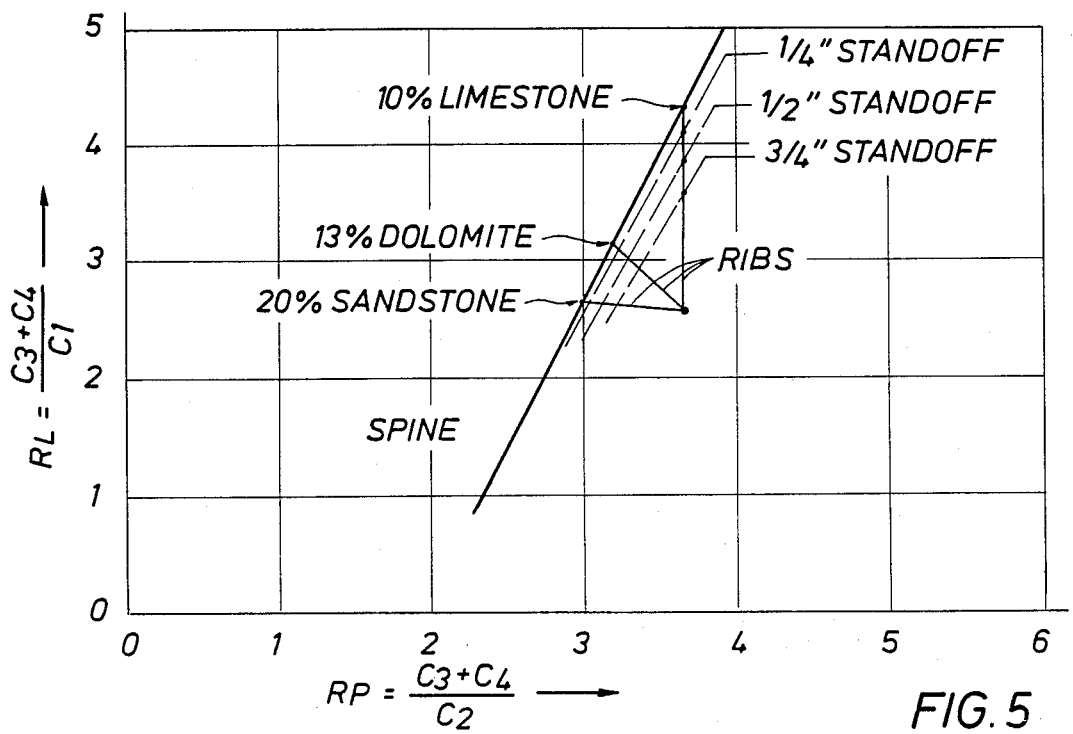
FIG. 5 shows a spine-and-ribs plot for two quantities defined in terms of the count rates of four energy windows of the short-spaced detector.

It is to be understood that a different selection of count rates could be made. FIG. 5 shows that a spine-and-rib analysis, similar to that described above and familiar to those skilled in the art, is capable of compensating a lithology-dependent factor for poor sonde contact with the formation, when quantities composed of count rates from all four energy windows are used.

Of course, it should also be understood that more variables could be introduced, as long as more external information is introduced or if more energy windows are used in the calculations.

The foregoing description may make other forms and embodiments of the invention apparent to those skilled in the art. It is the aim of the appended claims to cover all such changes and modifications that come within the true spirit and scope of the invention.

I claim:

1. A method of determining a quality indicator for lithology-dependent factor of a geological formation surrounding a borehole, irradiated by gamma rays, comprising:

producing at least two first measurement signals of scattered gamma rays from energy windows which are significantly affected by photoelectric absorption;

producing at least one additional measurement signal of scattered gamma rays from energy windows which are less sensitive to photoelectric absorption than said first measurement signals; and combining the measurement signals according to a predetermined relation to obtain a compensated lithology-dependent factor for each of said at least two energy windows which are significantly affected by photoelectric absorption, and using differences of the at least two lithology-dependent factors to judge the quality of the lithology-dependent factors.

2. The method of claim 1, in which all measurements are made with one detector.

3. A method of determining a lithology-dependent factor, the photoelectric factor $P_e$, of a geological formation surround a borehole, irradiated by gamma rays, comprising:

producing at least one first measurement signal of scattered gamma rays from at least one energy window that is significantly affected by photoelectric absorption;

producing at least one measurement signal of scattered gamma rays from at least one energy window which is less sensitive to photoelectric absorption than said first measurement signal; and combining the measurement signals according to a predetermined relationship to produce an indication of the photoelectric factor $P_e$ of the formation compensated for the density of the formation and the effects of mudcake or non-ideal pad contact with the formation.

4. The method of claim 3 in which all measurements are made with one detector.

5. The method of claim 3, in which the measurements significantly affected by photoelectric absorption are made with one detector, while the measurements less sensitive to photoelectric absorption are made with more than one detector.

6. A method of determining the density of a geological formation surrounding a borehole, irradiated by gamma rays, comprising:

producing one or more first measurements of scattered gamma rays from one gamma ray detector, said detector having energy windows which are significantly affected by photoelectric absorption;

producing one or more second measurements of scattered gammas rays from said one gamma ray detector, said detector having energy windows which are less sensitive to photoelectric absorption than said first measurement; and combining said first and second measurement to produce an indication of the formation density.

7. The method of claim 6 further including the step of obtaining from the first and second measurement combination, a measurement indicative of the distance between the sonde and the formation.

* * * * *